(12) United States Patent  
Kihara et al.

(10) Patent No.: US 8,970,193 B2  
(45) Date of Patent: Mar. 3, 2015

(54) STEP-DOWN DC-TO-DC CONVERTER

(75) Inventors: Nobuhiro Kihara, Chiyoda-ku (JP); Yuichi Muramoto, Chiyoda-ku (JP); Yusuke Higaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/526,171

(22) Filed: Jun. 18, 2012

(65) Prior Publication Data

US 2013/0214758 A1 Aug. 22, 2013

(30) Foreign Application Priority Data

Feb. 17, 2012 (JP) ................................ 2012-032341

(51) Int. Cl.
*G05F 1/00* (2006.01)
(52) U.S. Cl.
USPC ............................ 323/282; 323/222; 323/271
(58) Field of Classification Search
USPC .................. 323/222, 271, 282, 284, 285, 286
See application file for complete search history.

(56) References Cited

U.S. PATENT DOCUMENTS

| 4,916,380 | A | 4/1990 | Burroughs | |
|---|---|---|---|---|
| 6,259,237 | B1 * | 7/2001 | Fischer | 323/277 |
| 2003/0141857 | A1 * | 7/2003 | Nishida et al. | 323/282 |
| 2007/0018618 | A1 * | 1/2007 | Endo | 323/224 |
| 2011/0156495 | A1 * | 6/2011 | Saligram et al. | 307/115 |
| 2011/0241641 | A1 * | 10/2011 | Chen et al. | 323/284 |

FOREIGN PATENT DOCUMENTS

| DE | 199 13 464 A1 | 9/2000 |
|---|---|---|
| JP | H06 292357 A | 10/1994 |
| JP | H06 2922357 A | 10/1994 |
| JP | 2005 295753 A | 10/2005 |
| JP | 2009 183093 A | 8/2009 |
| JP | 2011 004557 A | 1/2011 |
| JP | 4784155 B2 | 10/2011 |

OTHER PUBLICATIONS

Japanese Office Action issued Aug. 20, 2013, Patent Application No. 2012-032341.
German Office Action, issued Feb. 20, 2014, Patent Application No. 10 2012 211 829.2.

* cited by examiner

*Primary Examiner* — Nguyen Tran
(74) *Attorney, Agent, or Firm* — Sughrue Mion, PLLC; Richard C. Turner

(57) ABSTRACT

An inductor L2 is inserted in series between an input power supply E and a switching device Q1. An input smoothing capacitor C2 is provided between a connecting point of the inductor L2 and the switching device Q1 and a ground point. Herein, let L2 be an inductance value of the inductor, C2 be an electrostatic capacity of the input smoothing capacitor, and T1 be a time since the switching device Q1 is switched from an ON state to an OFF state until the switching device Q1 is switched to an ON state again according to an output signal from a drive circuit DR, then T1 is set so as to satisfy $$0 < T1 < \pi\sqrt{L2 \times C2}$$

By lowering a voltage applied to a switching device when the switching device switches OFF from ON, it becomes possible to use a switching device having low breakdown voltage in a step-down DC-to-DC converter.

4 Claims, 10 Drawing Sheets

ON TIME T1

STEP-DOWN DC-TO-DC CONVERTER

BACKGROUND OF THE INVENTION

1. Technical Field

The present invention relates to a step-down DC-to-DC converter.

2. Related Art

FIG. 9 is a view showing a configuration of a step-down DC-to-DC converter in the related art. The step-down DC-to-DC converter in the related art is formed of a chopper switching device Q1 and a synchronous rectification switching device Q2 sequentially connected in series to an input power supply E, a reactor L1 connected sequentially in series between a connecting point of the switching devices Q1 and Q2 and a ground point, an output smoothing capacitor C1, and a drive circuit DR controlling the chopper switching device Q1 to switch ON and OFF. By allowing the drive circuit DR to output a drive signal to the chopper switching device Q1 so that an ON state of a predetermined time T1 and an OFF state of a predetermined time T2 are repeated alternately, an input voltage from the input power supply E is stepped down to a predetermined output voltage and supplied to a load L connected in parallel with the output smoothing capacitor C1.

FIG. 10 shows operation waveform charts of the step-down DC-to-DC converter in the related art. The abscissas are used for a time t and the ordinates from top to bottom are used for a positive terminal voltage of the switching device Q1, a negative terminal voltage of the switching device Q1, and a voltage across the switching device Q1, Vsw. Herein, when the switching device Q1 switches OFF from ON, a surge voltage Vsg expressed as L×di/dt is generated due to the presence of wire-induced parasitic inductance between the switching device Q1 and the input power supply E. Accordingly, an input voltage, Vin+Vsg, is applied to the positive terminal of the switching device Q1. Hence, it is necessary to design the switching device Q1 in considerations of Vin+Vsg. To this end, it is necessary to use a switching device having high breakdown voltage and slow down a switching speed. In short, it is necessary to increase 1/(di/dt).

RELATED ART DOCUMENT

Patent Document

Patent Document 1: Japanese Patent No. 4784155

Because a switching device having high breakdown voltage has problems that both a size of the device and a conduction loss are large, the step-down DC-to-DC converter in the related art as described above has problems that a size of the step-down DC-to-DC converter is increased and efficiency is deteriorated.

In addition, because a switching loss increases when a switching speed is slowed down, a switching period cannot be shortened. Hence, there arises a need for a large reactor and such a need raises a problem that a size of the DC-to-DC converter is increased.

SUMMARY OF THE INVENTION

The invention has an object to make a switching device having low breakdown voltage feasible and shorten a switching period in a step-down DC-to-DC converter by lowering a voltage applied to the switching device when the switching device switches OFF from ON or ON from OFF.

A step-down DC-to-DC converter according to a first aspect of the invention includes: a switching device and a free wheel semiconductor device sequentially connected in series to an input power supply; a reactor connected sequentially in series between a connecting point of the switching device and the free wheel semiconductor device and a ground point; an output smoothing capacitor; a drive circuit controlling the switching device to switch ON and OFF; an inductor inserted in series between the input power supply and the switching device; and an input smoothing capacitor provided between a connecting point of the inductor and the switching device and a ground point. Herein, let L be an inductance value of the inductor, C be an electrostatic capacity of the input smoothing capacitor, and T1 be a time since the switching device is switched from an OFF state to an ON state until the switching device is switched to an OFF state again according to an output signal from the drive circuit, then T1 is set so as to satisfy $$0<T1<\pi\sqrt{L\times C}$$

Also, a step-down DC-to-DC converter according to a second aspect of the invention includes: a switching device and a free wheel semiconductor device sequentially connected in series to an input power supply; a reactor connected sequentially in series between a connecting point of the switching device and the free wheel semiconductor device and a ground point; an output smoothing capacitor; a drive circuit controlling the switching device to switch ON and OFF; an inductor inserted in series between the input power supply and the switching device; and an input smoothing capacitor provided between a connecting point of the inductor and the switching device and a ground point. Herein, let L be an inductance value of the inductor, C be an electrostatic capacity of the input smoothing capacitor, and T2 be a time since the switching device is switched from an ON state to an OFF state until the switching device is switched to an ON state again according to an output signal from the drive circuit, then T2 is set so as to satisfy $$0<T2<\pi\sqrt{L\times C}$$

By setting the ON time T1 of the switching device shorter than half the resonance period of the inductor and the input smoothing capacitor provided between the input power supply and the switching device, the step-down DC-to-DC converter can not only lower a voltage across the switching device but also shorten the switching period.

The foregoing and other objects features, aspects, and advantages of the present invention will become more apparent from the following detailed description of the present invention when taken conjunction with the accompanying drawings.

DESCRIPTION OF THE PREFERRED EMBODIMENTS

First Embodiment

Figure 1:
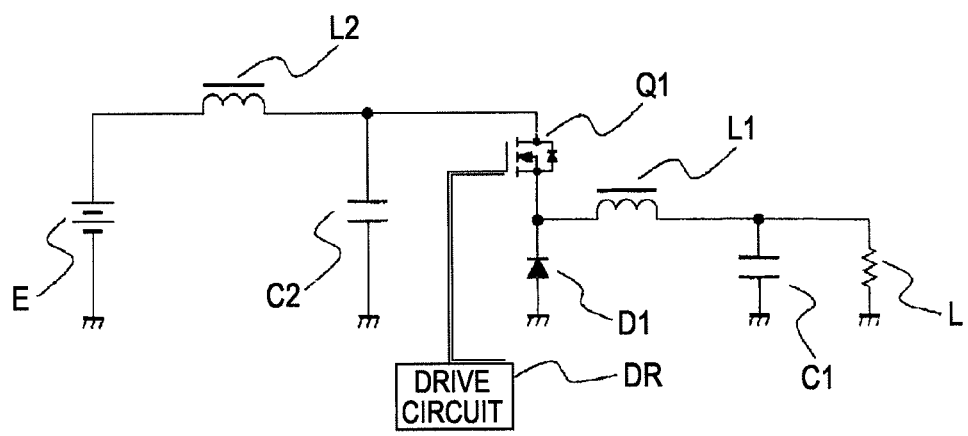
FIG. 1 is a view showing a configuration of a step-down DC-to-DC converter according to a first embodiment of the invention.

FIG. 1 is a view showing a configuration of a step-down DC-to-DC converter according to a first embodiment of the invention. The step-down DC-to-DC converter of the first embodiment is formed of a chopper switching device Q1 and a free wheel diode D1 sequentially connected in series to an input power supply E, a reactor L1 connected sequentially in series between a connecting point of the switching device Q1 and the free wheel diode D1 and a ground point, an output smoothing capacitor C1, and a drive circuit DR controlling the switching device Q1 to switch ON and OFF. In the step-down DC-to-DC converter configured in this manner, an inductor L2 is inserted in series between the input power supply E and the switching device Q1 and an input smoothing capacitor C2 is provided between a connecting point of the inductor L2 and the switching device Q1 and a ground point.

The reactor L2, the input smoothing capacitor C2, the switching device Q1, and the free wheel diode D1 together form a step-down converter portion whereas the reactor L1 and the output smoothing capacitor C1 together form a step-down output portion.

By allowing the drive circuit DR to output a drive signal to the switching device Q1 so that an ON state of a predetermined time T1 and an OFF state of a predetermined time T2 are repeated alternately, an input voltage is stepped down to a predetermined output voltage and supplied to a load L connected in parallel with the output smoothing capacitor C1.

Herein, let L2 be an inductance value of the inductor L2 and C2 be an electrostatic capacity value of the input smoothing capacitor C2. Then, the predetermined time T1 is set so as to satisfy $$0<T1<\pi\sqrt{L2\times C2}$$

Figure 2:
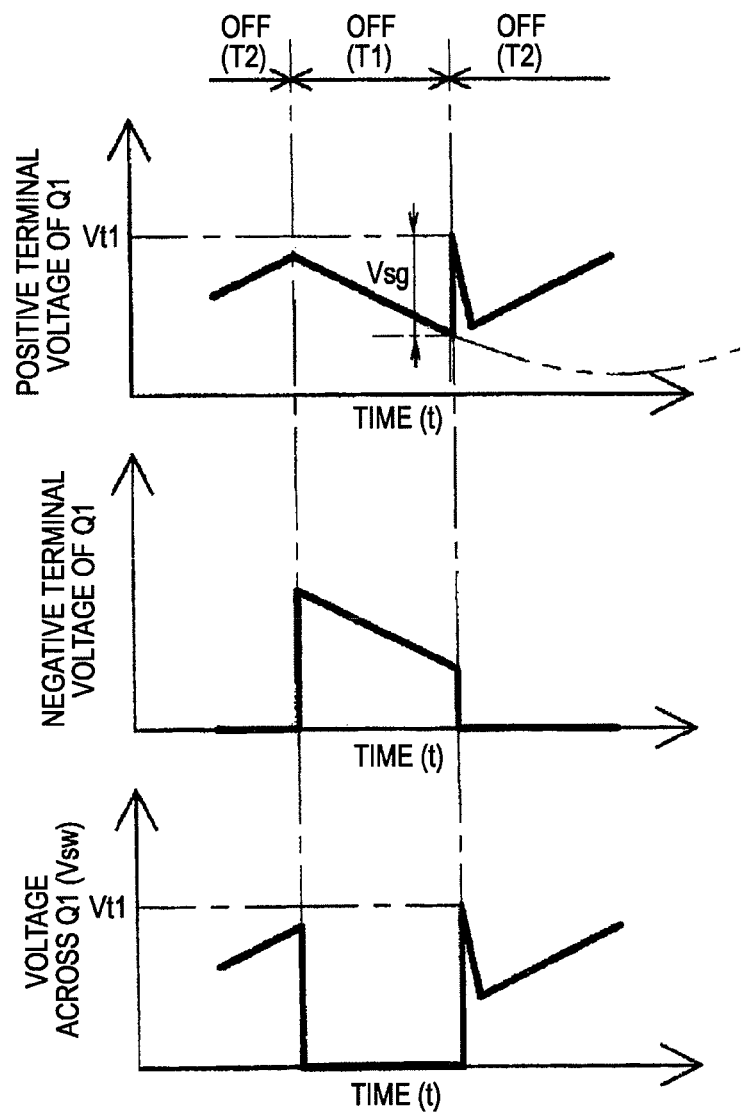
FIG. 2 shows operation waveform charts according to the first embodiment of the invention.

FIG. 2 shows operation waveforms according to the first embodiment of the invention. The abscissas are used for a time t and the ordinates from top to bottom are used for a positive terminal voltage of the switching device Q1, a negative terminal voltage of the switching device Q1, and a voltage across the switching device Q1, Vsw.

During an OFF period of the switching device Q1, a current supplied from an input side via the inductor L2 is charged to the input smoothing capacitor C2. Hence, a positive terminal voltage of the switching device Q1 rises. In the meantime, a current flows into the reactor L1 via the free wheel diode D1. Hence, a negative terminal voltage of the switching device Q1 is about 0 V (only a voltage drop across the diode with respect to ground potential).

During an ON period of the switching device Q1, a current flows into the reactor L1 via the switching device Q1. Hence, the input smoothing capacitor C2 is discharged and the positive terminal voltage of the switching device Q1 drops. On the other hand, the negative terminal voltage of the switching device Q1 drops to about 0 V with respect to the positive terminal voltage (only a voltage drop caused by an ON resistance).

When the switching device Q1 again switches OFF from ON, a voltage Vt1, which is a voltage across the input smoothing capacitor C2 superimposed with a surge voltage Vsg generated by parasitic inductance, is applied to the positive terminal of the switching device Q1.

Figure 3:
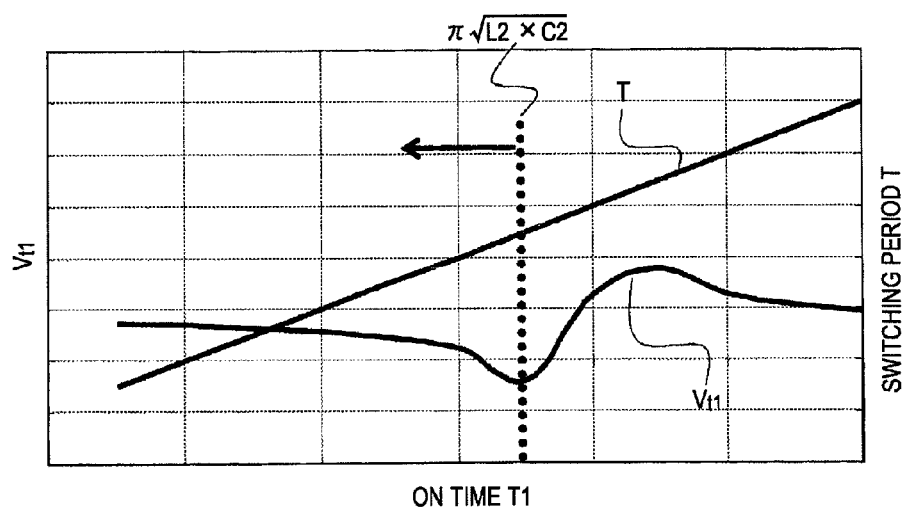
FIG. 3 is a view used to describe a relation of a voltage across a switching device and a switching period according to the first embodiment of the invention.

FIG. 3 shows a relation of T1, Vt1, and a switching period T (=T1+T2).

As is shown in the drawing, Vt1 drops to a lowest voltage when T1 substantially coincides with $$\pi\sqrt{L2\times C2}$$

Thereafter, Vt1 repeats pulsation.

On the other hand, because the switching period T is a sum of T1 and T2, given a same step-down ratio, T2 and T1 have a proportional relation. Hence, the switching period T is proportional to T1.

In other words, by making the ON time T1 of the switching device Q1 shorter than half the resonance period of the inductor L2 and the input smoothing capacitor C2, not only can Vt1 be lowered, but also the switching period T can be shortened.

More specifically, because it becomes possible to use a switching device having low breakdown voltage, the switching device can be smaller in size and the switching period can be shorter. Accordingly, the inductance value L1 of the reactor L1 can be smaller, which can in turn reduce the reactor L1 in size. Further, because the DC-to-DC converter can be reduced in size, a degree of freedom in layout can be enhanced for use in circumstances where an attachment space is limited, for example, in-vehicle use.

In particular, Vt1 can be lowered to the minimum extent possible when T1 substantially coincides with $$\pi\sqrt{L2\times C2}$$

Figure 4:
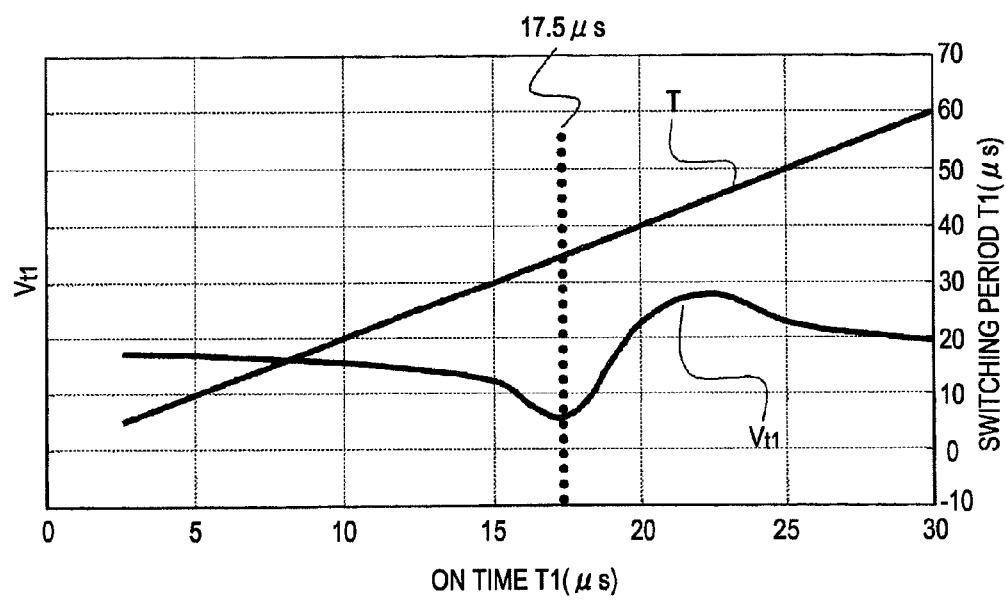
FIG. 4 is a view used to describe an application example of the first embodiment of the invention.

For example, FIG. 4 shows a relation between T1 and Vt1 and a relation between T1 and the switching period T when L2 is 2 µH, C2 is 20 µF, and a voltage transformation ratio is 1/2. As is shown in FIG. 4, Vt1 becomes a minimum when T1 is 17.5 µs at which T1 substantially coincides with $$\pi\sqrt{L2\times C2}$$

In comparison with the configuration in the related art, Vt1 becomes smaller.

In the first embodiment, a MOSFET is shown as the switching device Q1. It should be appreciated, however, that other switching devices, for example, an IGBT and a bipolar transistor, are also available.

Also, a diode is used as the free wheel element. It should be appreciated, however, that other semiconductor devices, such as a MOSFET, are also available.

Second Embodiment

Figure 5:
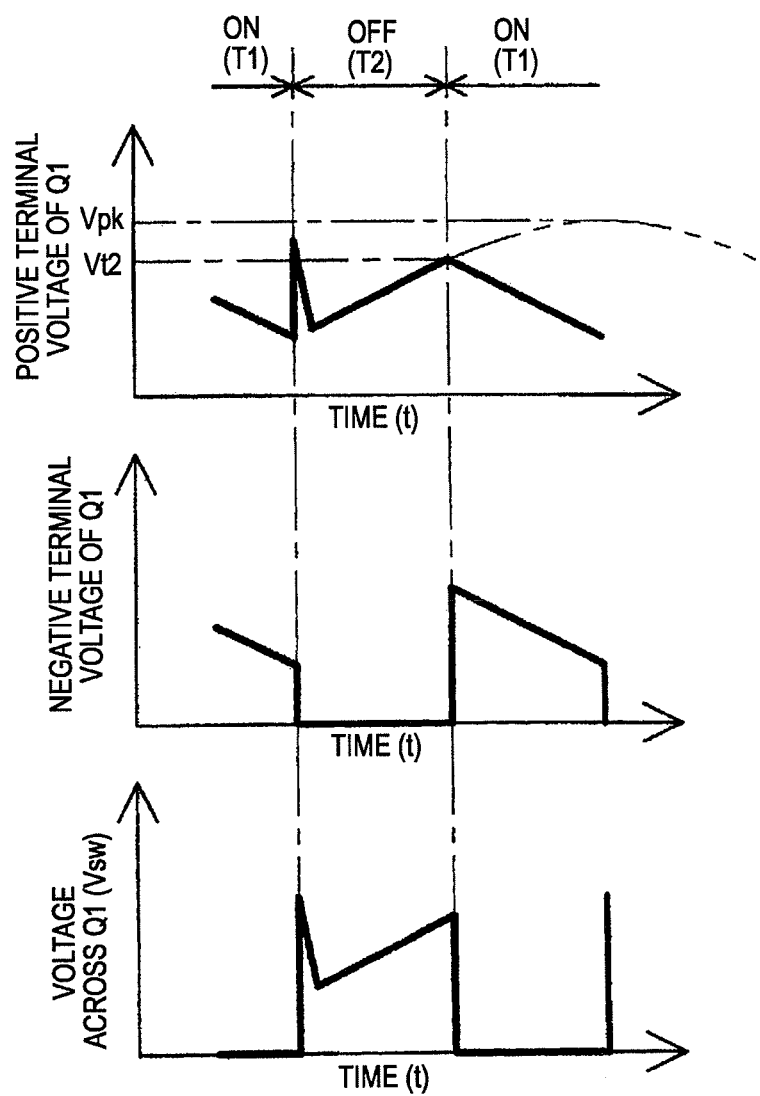
FIG. 5 shows operation waveform charts according to a second embodiment of the invention.

FIG. 5 shows operation waveforms according to a second embodiment of the invention. The abscissas are used for a time t and the ordinates from top to bottom are used for a positive terminal voltage of the switching device Q1, a negative terminal voltage of the switching device Q1, and a voltage across the switching device Q1, Vsw. The configuration of the step-down DC-to-DC converter is the same as that of the first embodiment above.

By allowing the drive circuit DR to output a drive signal to the switching device Q1 so that an ON state of a predetermined time T1 and an OFF state of a predetermined time T2 are repeated alternately, an input voltage is stepped down to a predetermined output voltage.

Herein, let L2 be an inductance value of the inductor L2 and C2 be an electrostatic capacity value of the input smoothing capacitor C2. Then, T2 is set so as to satisfy $$0 < T2 < \pi\sqrt{L2 \times C2}$$

When the switching device Q1 switches OFF from ON, a current supplied from the input side via the inductor L2 is charged to the input smoothing capacitor C2. Hence, a positive terminal voltage of the switching device Q1 rises. In the meantime, because a current flows into the reactor L1 via the free wheel diode D1, a negative terminal voltage of the switching device Q1 is about 0 V (only a voltage drop across the diode with respect to ground potential).

Herein, when the switching device Q1 switches ON from OFF, a voltage across the input smoothing capacitor C2, that is, the positive terminal voltage of the switching device Q1, rises to Vt2, which is lower than a peak voltage Vpk generated by resonance of the inductor L1 and the input smoothing capacitor C2. Hence, it becomes possible to use a low voltage switching device.

Figure 6:
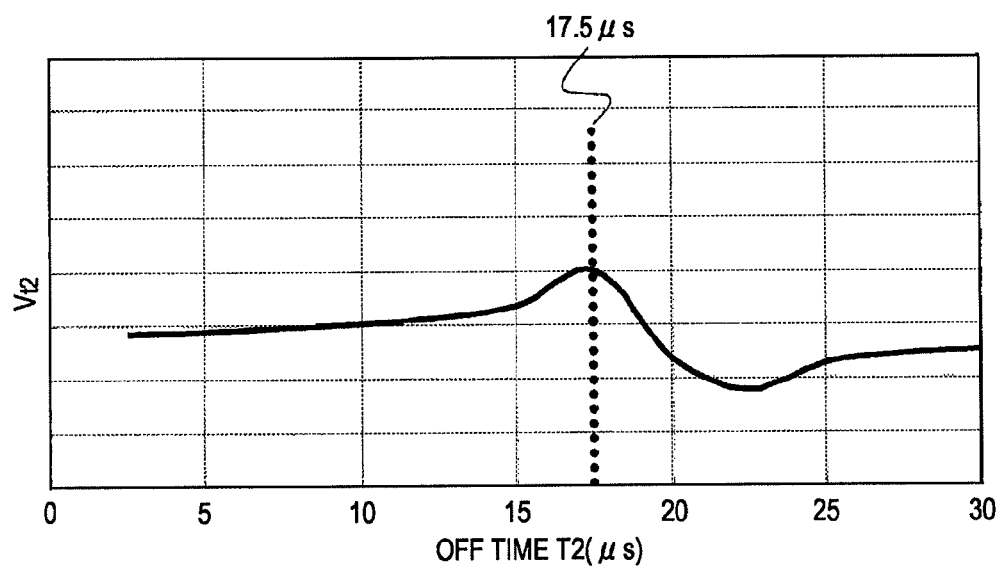
FIG. 6 is a view used to describe an application example of the second embodiment of the invention.

For example, FIG. 6 shows a relation between T2 and Vt2 when L2 is 2 µH, C2 is 20 µF, and a voltage transformation ratio is 1 to 2. As is shown in FIG. 6, Vt2 reaches a maximum when T2 is 17.5 µs at which T2 substantially coincides with $$\pi\sqrt{L2 \times C2}$$

That is, Vt2 can be lower than Vpk when the switching device Q1 is operated in a range within which T2 satisfies $$0 < T2 < \pi\sqrt{L2 \times C2}$$

Third Embodiment

Figure 7:
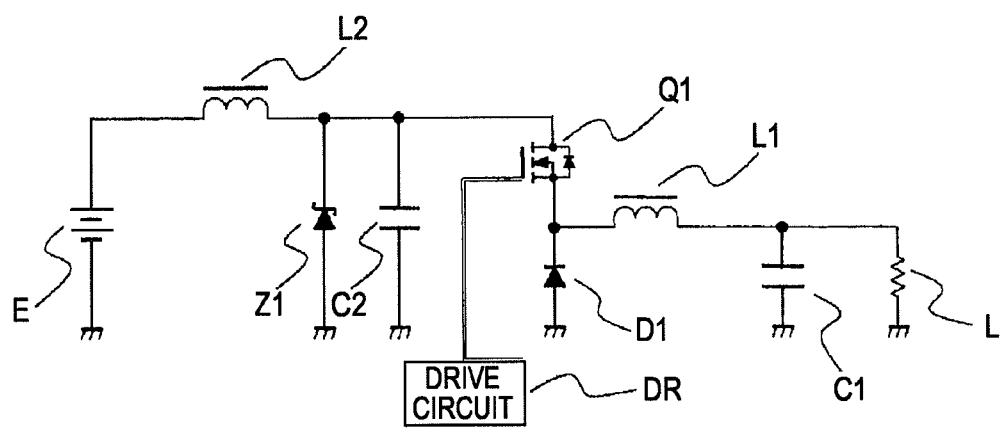
FIG. 7 is a view showing a configuration of a step-down DC-to-DC converter according to a third embedment of the invention.

FIG. 7 is a view showing a configuration of a DC-to-DC converter according to a third embodiment of the invention. In the DC-to-DC converter of the third embodiment, a zener diode Z1 for surge absorption is connected in parallel with the input smoothing capacitor C2 in the circuit of FIG. 1. The rest is the same as the circuit of FIG. 1 in the first embodiment above.

By allowing the drive circuit DR to output a drive signal to the switching device Q1 so that an ON state of a predetermined time T1 and an OFF state of a predetermined time T2 are repeated alternately, an input voltage is stepped down to a predetermined output voltage.

Herein, let L2 be an inductance value of the inductor L2 and C2 be an electrostatic capacity value of the input smoothing capacitor C2. Then, T1 and T2 are set so as to satisfy $$0 < T1 < \pi\sqrt{L2 \times C2}$$

$$0 < T2 < \pi\sqrt{L2 \times C2}$$

Figure 8:
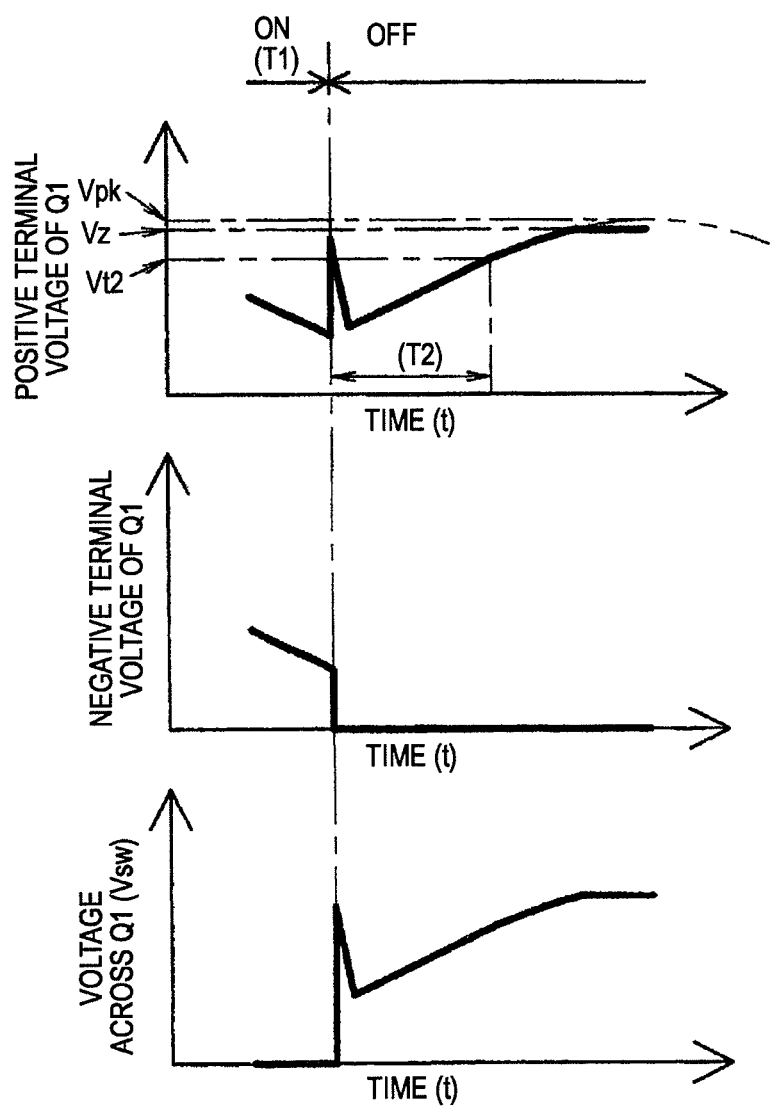
FIG. 8 shows operation waveform charts according to the third embodiment of the invention.
Figure 9:
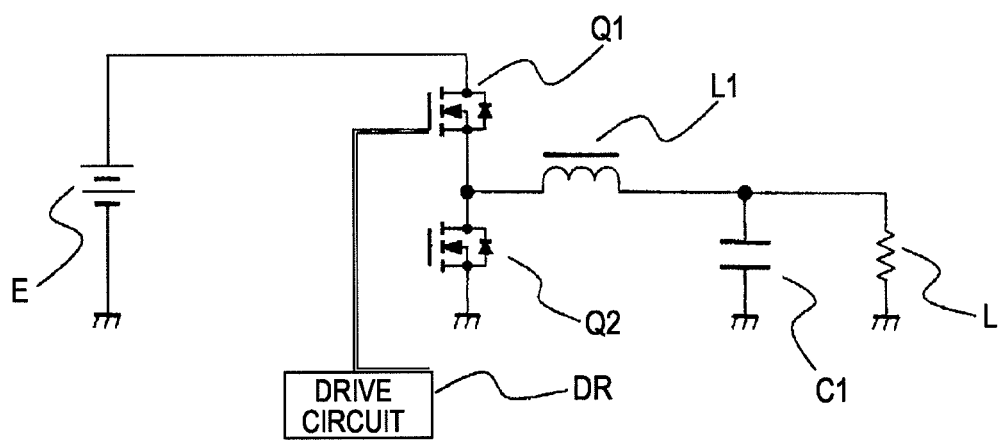
FIG. 9 is a view showing a configuration of a step-down DC-to-DC converter in the related art.
Figure 10:
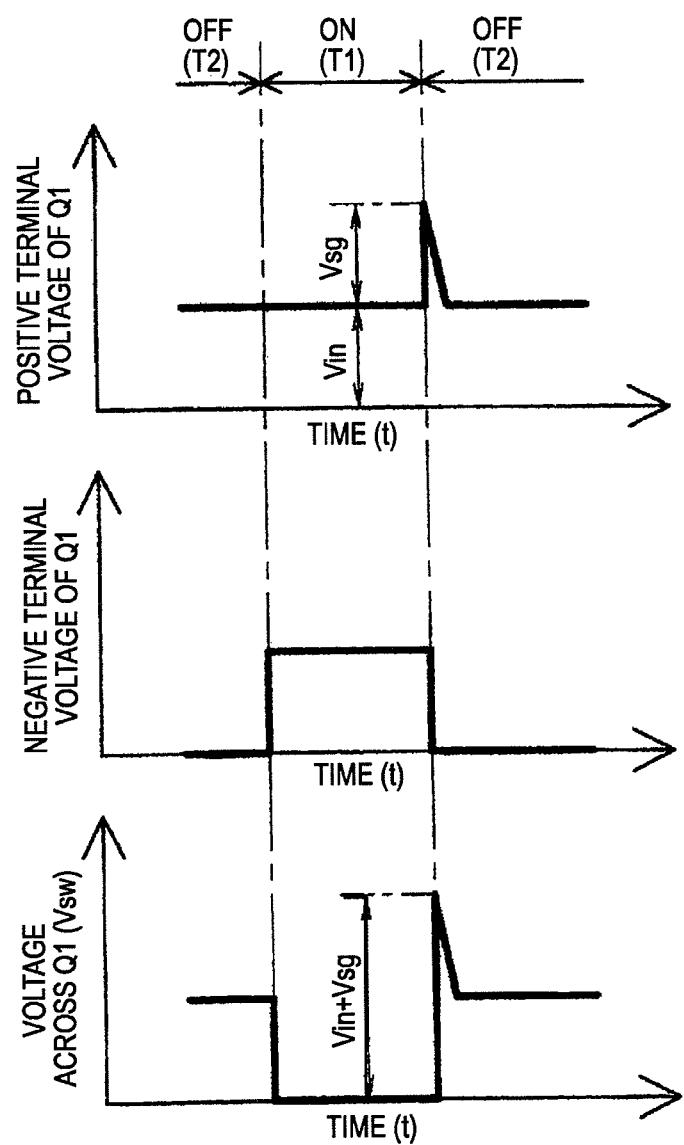
FIG. 10 show operation waveform charts of the step-down DC-to-DC converter in the related art.

FIG. 8 shows operation waveforms of a step-down DC-to-DC converter according to a third embodiment of the invention. The abscissas are used for a time t and the ordinates from top to bottom are used for a positive terminal voltage of the switching device Q1, a negative terminal voltage of the switching device Q1, and a voltage across the switching device Q1, Vsw.

When the switching device Q1 is switched OFF from ON to stop driving of the step-down DC-to-DC converter, a current supplied from the input end via the inductor L2 is charged to the input smoothing capacitor C2. Accordingly, a positive terminal voltage of the switching device Q1 rises above a positive terminal voltage Vt2 of the switching device Q1 during a driving OFF time T2.

Herein, by setting an operating voltage Vz of the zener diode Z1 for surge absorption at or above Vt2 and at or below a peak voltage Vpk generated by resonance of the inductor L2 and the input smoothing capacitor C2, it becomes possible to use a switching device having low breakdown voltage.

The zener diode Z1 for surge absorption does not operate while the step-down DC-to-DC converter is driven and therefore the zener diode Z1 for surge absorption operates only on one pulse when the step-down DC-to-DC converter is at rest. Hence, not only does it become possible to select a zener diode having a relatively small capacity, but it also becomes possible to avoid deterioration of efficiency during normal driving.

A zener diode is used as the surge absorbing element. It should be appreciated, however, that other surge absorbing elements, for example a varistor, are also available.

Various modifications and alterations of this invention will be apparent to those skilled in the art without departing from the scope and spirit of this invention, and it should be understood that this is not limited to the illustrative embodiments set forth herein.

What is claimed is:

1. A step-down DC-to-DC converter, comprising:
   a switching device and a free wheel semiconductor device sequentially connected in series to an input power supply;
   a reactor connected sequentially in series between a connecting point of the switching device and the free wheel semiconductor device and a ground point;
   an output smoothing capacitor;
   a drive circuit connected directly to the switching device and controlling the switching device to switch ON and OFF;
   an inductor inserted in series between the input power supply and the switching device; and
   an input smoothing capacitor provided between a connecting point of the inductor and the switching device and a ground point,
   wherein when L is an inductance value of the inductor, C is an electrostatic capacity of the input smoothing capacitor, and T1 is a time beginning when the switching device is switched from an OFF state to an ON state and continuing until the switching device is switched to an OFF state again according to an output signal from the drive circuit, then T1 is set so as to satisfy $$0 < T1 < \pi\sqrt{L \times C}.$$

2. The step-down DC-to-DC converter according to claim 1, Wherein:

$$\pi\sqrt{L \times C}.$$

3. A step-down DC-to-DC converter, comprising:
   a switching device and a free wheel semiconductor device sequentially connected in series to an input power supply;
   a reactor connected sequentially in series between a connecting point of the switching device and the free wheel semiconductor device and a ground point;
   an output smoothing capacitor;
   a drive circuit connected directly to the switching device and controlling the switching device to switch ON and OFF;
   an inductor inserted in series between the input power supply and the switching device; and
   an input smoothing capacitor provided between a connecting point of the inductor and the switching device and a ground point,
   wherein when L is an inductance value of the inductor, C is an electrostatic capacity of the input smoothing capacitor, and T2 is a time beginning when the switching device is switched from an ON state to an OFF state and continuing until the switching device is switched to an ON state again according to an output signal from the drive circuit, then T2 is set so as to satisfy.

$$0 < T2 < \pi\sqrt{L \times C}.$$

4. The step-down DC-to-DC converter according to claim 3, further comprising:
a surge absorbing element provided in parallel with the input smoothing capacitor,
wherein when the switching device is in a driving state where the switching device repetitively switches ON and OFF, Vt2 is a voltage across the input smoothing capacitor after the time T2 when the switching device is switched to an OFF state from an ON state, Vpk is a maximum value of the voltage across the input smoothing capacitor after the switching device switches to an OFF state from an ON state, and Vz is an operating voltage of the surge absorbing element, then a relation expressed below is satisfied:

$$Vpk > Vz > Vt2.$$

\* \* \* \* \*